Aug. 20, 1929.  T. M. EYNON  1,725,705
LIQUID LEVEL INDICATOR
Filed July 28, 1922
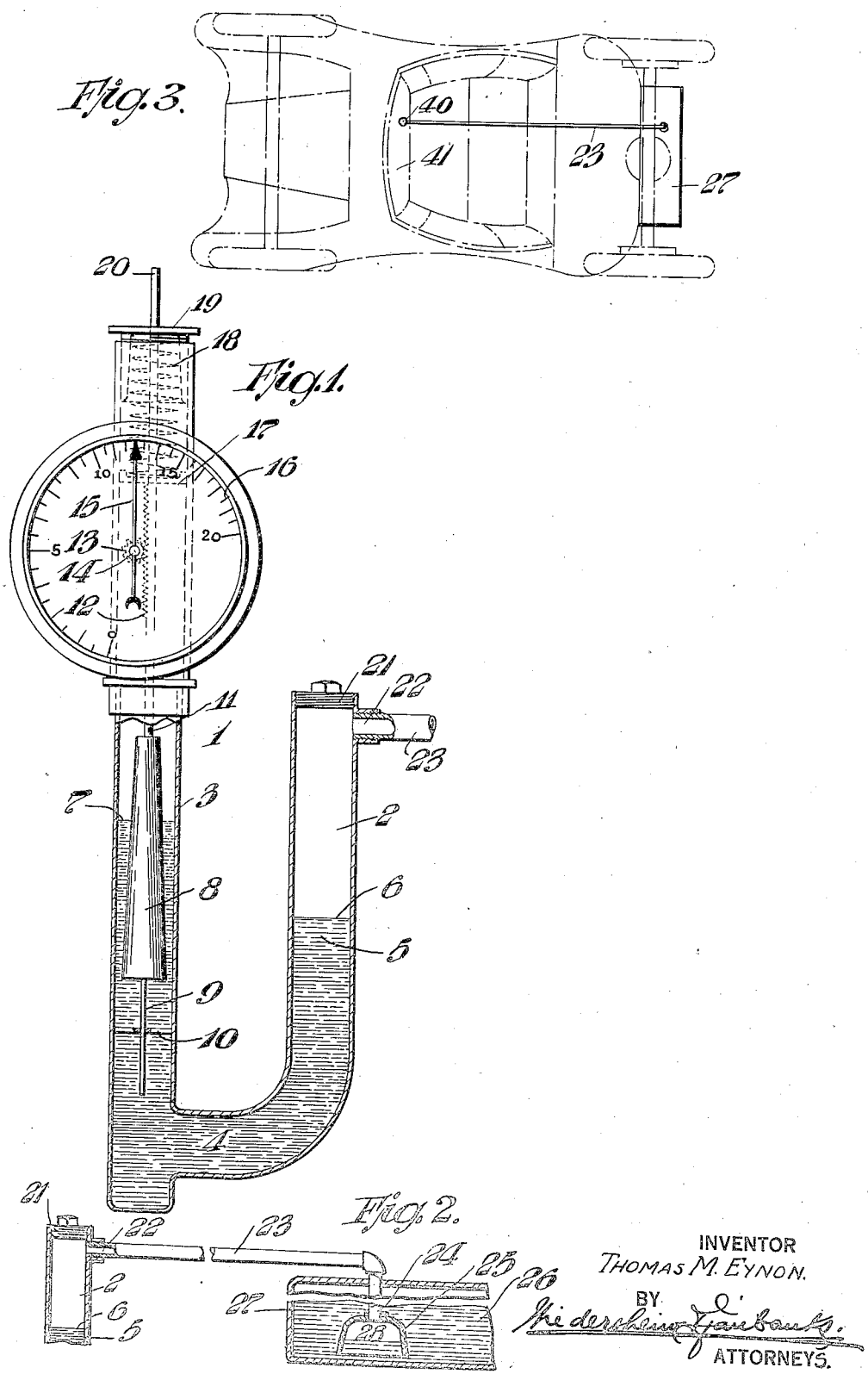
INVENTOR
THOMAS M. EYNON.
BY
ATTORNEYS.

Patented Aug. 20, 1929.

1,725,705

UNITED STATES PATENT OFFICE.

THOMAS M. EYNON, OF PHILADELPHIA, PENNSYLVANIA.

LIQUID-LEVEL INDICATOR.

Application filed July 28, 1922. Serial No. 578,258.

My invention relates to a novel gasoline indicator, which can be readily installed upon automobiles or other self-propelled vehicles or upon tanks of any standard or conventional type without change therein, whereby the height or level of the gasoline or other liquid will be visually indicated with great accuracy at the desired point through the agency of a fluid medium and since no liquid or mechanical elements are employed in the pipe running from the tank to the instrument board, the use of rods, links and other mechanical connections as well as a float in the gasoline tank is entirely dispensed with.

In carrying out my invention, I employ a novel construction of U-shaped tube adapted in the case of an automobile to be secured on the instrument board at any desired point, said U-shaped tube consisting of two upright members connected at their lower portions, one of said members containing a liquid in which is immersed a float which may be in the shape of a cylinder or truncated cone, novel means being provided for retarding the buoyancy of the float which may be positioned above or below the latter, as will be hereinafter described.

It further consists in connecting a novel U-shaped tube or the character above referred to, to an inverted bell or U-shaped chamber adapted to be immersed in the gasoline or other liquid, whose level is to be indicated, the pressure within said bell chamber being transferred to the upper portion of one of the U-shaped tube members and the pressure or variations of pressure in the upper portion of said U-shaped tube member being utilized to cause a variation of the level of the liquid in the U-shaped tube members according to variations of pressure within the bell in the gasoline tank, whereby all variations of the level of the liquid in the gasoline or other tank are accurately and instantly indicated at the desired point through the medium of a float in the float chamber or member of said U-shaped tube.

It further consists of other novel features of construction, all as will be hereinafter fully set forth.

For the purpose of illustrating my invention, I have shown in the accompanying drawings a form thereof which is at present preferred by me, since it will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical sectional view of a U-shaped tube for a gasoline indicator embodying my invention, showing a conical float in the float chamber thereof, which is provided with a spring or equivalent retarding device positioned above the float, certain parts of the device being shown in elevation.

Figure 2 represents a fragmentary view showing the connection from one of the members of the U-shaped tube to an inverted cup or bell adapted to be immersed in the gasoline or other liquid, whose level is to be indicated.

Figure 3 represents in dotted lines a plan view of an automobile, the tank and connections therefrom to my novel gasoline indicator being shown in full lines.

Similar numerals of reference indicate corresponding parts.

Referring to the drawings:—

In carrying out my invention the form of U-shaped tube seen in Fig. 1 is employed wherein the U-shaped tube 1 is composed of the upright members 2 and 3, which are joined at their lower portion by the connection 4. Within the members of the U-shaped tube is contained a suitable liquid, as indicated at 5, which is preferably a suitable oil, which will not freeze or evaporate, and the respective different approximate heights or levels of said liquid 5 in the members 2 and 3 are indicated at the points 6 and 7 respectively.

Within the member 3 of the U-shaped tube, which serves as a float chamber, I locate the float 8, which may be of conical shape or in the shape of a truncated cone, from whose lower portion depends the guide rod or stem 9, which is guided in the spider or the like 10. From the upper end of the conical float 8 extends the upper rod or stem 11, which is provided with the rack 12, which engages a pinion 13 mounted on the shaft 14, which carries the pointer 15, which is adapted to be read in connection with the dial 16. The upper portion of the rod 11, at a point above the rack 12 has secured thereto the plate or disc 17 by welding, brazing or other means, against which abuts the lower end of the spring 18, the upper end of said spring abutting against the bottom of the upper closure 19, through which the upper end 20 of the rod 11 passes and in which said upper end is guided, so that it will be seen that the conical float 8 is positively and accurately guided in its up and down movements, so that the rack teeth 12 will accurately engage and actuate the pinion 13, as is evident.

The upper end of the upright member 2 of the U-shaped tube is provided with a suitable plug or closure 21, below which the upper terminal 22 of the pipe 23 enters or communications with the chamber above the liquid level. The other or lower terminal 24 of the pipe 23 carries the bell or inverted cup or U-shaped chamber 25, which is adapted to be immersed in the gasoline or other liquid 26 contained within the tank 27, said bell 25 having in the upper portion thereof the pressure chamber 28.

It will be understood that in practice the internal area, or pressure chamber 28, of the bell 25 in the gasoline or other tank 27 is much larger than the co-acting area of the U-shaped tube 1, so that if the tank 27 is half filled with gasoline or other liquid, the air entrapped in the chamber 28 of the bell, will only permit the liquid to rise within the bell, say for example, one inch, while the liquid level 7 in the float chamber 3 of the U-shaped tube due to the pressure of the air in the connecting tube 23 leading from the gasoline tank 27 will have risen say four inches. I have found that if heat is applied to the connecting pipe 23 between the tank and the indicator, the expansion of air caused by this heat will not materially affect the height or variation of the liquid 5 in the U-shaped tube 1, for the reason that the height of the liquid in the bell 25 has only varied one inch.

I have found by numerous experiments that this operation if continued under all conditions will give exactly the same results, namely, the height of the liquid in the U-shaped tube 1 is not affected by variations of temperature or climatic conditions, but varies synchronously and simultaneously with the level of the liquid 26 in the tank 27, it being apparent that said latter variation causes the pressure within the pressure chamber 28 of the bell 25 to increase or decrease.

It will readily be seen from the foregoing that as the water level or the height of the gasoline or other liquid in the tank 27 varies, a corresponding variation of pressure will be created in the pressure chamber 28 within the bell and that such variations of pressure will be instantly transferred to the liquid level 6 through the tube 23 and the chamber in the top of the member 2 of the U-shaped tube 1, whereupon an instantaneous and accurate corresponding variation of the liquid levels 6 and 7 within said tube will occur, thereby causing the float 8 instantly to rise or fall, according to said variations, so that all variations of level of the gasoline in the tank 27 will be instantly indicated by the pointer 15 upon the scale 16.

The action of the float 8 will obviously be retarded through the medium of the tension of the spring 18, as is evident, the spring being initially set or its tension adjusted to suit varying conditions by the manipulation of the threaded closure 19 to the desired extent.

It will be understood that the U-shaped tube or the member thereof carrying the indicating devices may be secured to the instrument board 41 of the automobile, as seen in Figure 3, so that the indicating devices will be readily visible to the driver of the automobile.

While I have designed my novel indicator particularly for use in automobiles or other self-propelled vehicles, since the same is capable of being readily installed thereon, without any change or dismantling of any of the standard automobile units, it will be apparent that the broad principle of my invention is applicable to stationary tanks or for indicating the height or variations of level of other liquids than gasoline, and it will be understood that in its broad adaptation, my invention is applicable as an indicator for indicating the variations in level of any other liquid than gasoline, and is equally capable of adaptation to any tank containing such liquid, for the purpose specified.

It will be apparent that my invention being operated solely by variations of pressure within the chamber 28 of the bell 25 will be entirely automatic in its operation, and that it dispenses entirely with a float in the gasoline tank and with all mechanical connections intermediate such float and the indicating devices, so that there is no liability of the apparatus getting out of order after being installed in position, and owing to its great simplicity and the absence of any mechanical connections, it can be readily installed upon any standard automobile without the employment of skilled labor and without dismantling or taking down of any of the standard automobile units, it being immaterial whether the gasoline tank is located at the rear of the automobile as shown in Figure 3, or in any other position upon the chassis.

It will therefore be apparent from the foregoing that my novel indicator is not affected by changes in temperature or altitudes, no special chemical fluid is required, no float is necessary in the tank, there is no liquid in the pipe running from the tank to the instrument board, it can be used on all forms and positions of gasoline tanks, and its operation is not affected by the varying positions or inclinations of the gasoline tank during the progress of the automobile up or down grades, hills, mountains or the like.

It will now be apparent that I have devised a novel and useful gasoline indicator, which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a gasoline indicator, a U-shaped tube adapted to contain a liquid, a supply pipe for conveying variations of pressure leading to the top of one branch of said tube, the lower ends of said tube being in communication, a float in the opposite branch of said tube, guiding devices below the lower end of said float for guiding the latter, a closure for said float containing branch, said closure having screw-threaded relation with the top of said branch, a rod provided with rack teeth extending upwardly from said float and guided in said closure, means provided in said closure for guiding said rod, an indicating device including a pinion and dial pointer actuated by said rack teeth, and a spring arranged within said closure and above said float for retarding the upward movement thereof, the tension of said spring being varied by the adjustment of said closure.

2. In a device of the character stated, a U-shaped tube, comprising upright branches connected at their bottom ends, a supply pipe for conveying variations of pressure leading to the top of one branch of said tube, a conical float in the opposite branch of said tube, guiding devices below the lower end of said float for guiding the latter, an adjustable closure for the top of said float containing branch, a rod provided with rack teeth extending upwardly from said float and guided in said closure, means provided in said closure for guiding said rod, indicating devices including a pinion and dial pointer actuated by said rod, and a spring arranged within said closure and above said float for retarding the upward movement thereof, the tension of said spring being varied by the adjustment of said closure.

THOMAS M. EYNON.